United States Patent
Wollenweber (10) Patent No.: US 7,155,047 B2
(45) Date of Patent: Dec. 26, 2006

(54) METHODS AND APPARATUS FOR ASSESSING IMAGE QUALITY

(75) Inventor: Scott David Wollenweber, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 726 days.

(21) Appl. No.: 10/324,991

(22) Filed: Dec. 20, 2002

(65) Prior Publication Data
US 2004/0120565 A1 Jun. 24, 2004

(51) Int. Cl.
*G06K 9/00* (2006.01)
*G06K 9/64* (2006.01)
*G01T 1/166* (2006.01)

(52) U.S. Cl. .......... 382/131; 382/278; 250/363.04
(58) Field of Classification Search ......... 382/131, 382/278; 250/363.04
See application file for complete search history.

(56) References Cited

U.S. PATENT DOCUMENTS

| | | | |
|---|---|---|---|
| 5,272,343 A * | 12/1993 | Stearns | 250/363.03 |
| 5,703,965 A * | 12/1997 | Fu et al. | 382/232 |
| 5,750,991 A | 5/1998 | Moyers et al. | |
| 6,040,580 A | 3/2000 | Watson et al. | |
| 6,175,655 B1 | 1/2001 | George, III et al. | |
| 6,521,893 B1 | 2/2003 | Stark | |
| 6,870,898 B1 * | 3/2005 | von der Haar | 378/97 |
| 2003/0200655 A1 * | 10/2003 | Vafi et al. | 29/854 |

OTHER PUBLICATIONS

R. Kim, T. Aw, S. Bacharach, R.O. Bonow, "Correlation of Cardiac MRI and PET Images Using Long Cavities as Landmarks", 1991, IEEE, 49-52.*

* cited by examiner

*Primary Examiner*—Bhavesh M. Mehta
*Assistant Examiner*—Utpal Shah
(74) *Attorney, Agent, or Firm*—Carl B. Horton, Esq.; Armstrong Teasdale LLP (57) ABSTRACT

A method for retrospectively measuring a plurality of transmission datasets collected using an imaging system includes acquiring a plurality of multi-axial field-of-view (AFOV) datasets, the datasets including a plurality of pairs of adjacent images, determining a correlation value for each pair of adjacent images, calculating a derivative for the correlation values, and generating an indication when the derivative exceeds a predetermined threshold.

25 Claims, 6 Drawing Sheets

METHODS AND APPARATUS FOR ASSESSING IMAGE QUALITY

BACKGROUND OF THE INVENTION

This invention relates generally to imaging systems, and more particularly, to methods and apparatus for retrospectively assessing image quality of images from imaging systems.

At least one known PET transmission scan is acquired using a rotating source of dual-511 keV gamma rays, such as the Ge-68 rod sources implemented on imaging systems, such as a PET Advance system from General Electric Medical Systems, Waukesha, Wis. During a multiple axial field-of-view (AFOV) study, image quality loss at the end slices of each axial FOV due to lower system sensitivity on these slices may cause an operator to question the overall image quality of the study. This loss of sensitivity is typically corrected by overlapping the axial fields-of-view (AFOVs) by at least one slice of data between two adjacent AFOVs. However, there is often still some degradation in the statistical quality of the overlap slices due to larger patient size (larger patient size typically equals a lower statistical quality), depleting transmission rod source strength, or a shorter transmission scan duration. Often, the attenuation-corrected emission images are viewed in an orthogonal reformat, and a coronal view may show these overlap areas as 'bands' of different image quality from surrounding areas. These bands may cause an image reader to question the quality of other areas of the image set. There are several known methods to correct this problem, such as lengthening the transmission scan duration or replacing one or both of the radioactive rod sources. However, often in the clinical setting one can not predict the necessity of pin replacement or probability of occurrence of image quality problems prior to performing the patient scan.

BRIEF SUMMARY OF THE INVENTION

In one aspect, a method for retrospectively measuring a plurality of transmission datasets collected using an imaging system is provided. The method includes acquiring a plurality of multi-axial field-of-view (AFOV) datasets, the datasets including a plurality of pairs of adjacent images, determining a correlation value for each pair of adjacent images, calculating a derivative for the correlation values, and generating an indication when the derivative exceeds a predetermined threshold.

In another aspect, a method for retrospectively measuring a plurality of transmission datasets collected using Positron Emission Tomography (PET) system is provided. The method includes acquiring a plurality of multi-axial field-of-view (AFOV) datasets, the datasets including a plurality of pairs of adjacent images, determining a correlation value for each pair of adjacent images in accordance with $$Correl(a, b) = \frac{1}{(n-1)} \frac{\sum (a_i - \bar{a})(b_i - \bar{b})}{\sigma_a \sigma_b}$$

where
n is the number of pixels in a dataset,
$a_i$ is an ith pixel of dataset a,
$b_i$ is an ith pixel of dataset b,
$\bar{a}$ is an average of all pixels in dataset a,
$\bar{b}$ is an average of all pixels in dataset b,
$\sigma_a$ is a standard deviation of the pixels in dataset a, and
$\sigma_b$ is a standard deviation of the pixels in dataset b,
calculating a first derivative and a second derivative for the correlation values using a three-dimensional Lagrangian interpolation algorithm, and generating an indication when the second derivative exceeds a predetermined threshold.

In a further aspect, an imaging system including a radiation source, a radiation detector, and a computer operationally coupled to the radiation source and the radiation detector is provided. The computer is configured to acquire a plurality of multi-axial field-of-view (AFOV) datasets, the datasets including a plurality of pairs of adjacent images, determine a correlation value for each pair of adjacent images, calculate a derivative for the correlation values, and generate an indication when the derivative exceeds a predetermined threshold.

In still another aspect, a Positron Emission Tomography (PET) system including a radiation source, a radiation detector, and a computer operationally coupled to the radiation source and the radiation detector is provided. The computer is configured to acquire a plurality of multi-axial field-of-view (AFOV) datasets, the datasets including a plurality of pairs of adjacent images, determine a correlation value for each pair of adjacent images in accordance with $$Correl(a, b) = \frac{1}{(n-1)} \frac{\sum (a_i - \bar{a})(b_i - \bar{b})}{\sigma_a \sigma_b}$$

where
n is the number of pixels in a dataset,
$a_i$ is an ith pixel of dataset a,
$b_i$ is an ith pixel of dataset b,
$\bar{a}$ is an average of all pixels in dataset a,
$\bar{b}$ is an average of all pixels in dataset b,
$\sigma_a$ is a standard deviation of the pixels in dataset a, and
$\sigma_b$ is a standard deviation of the pixels in dataset b,
calculate a first derivative and a second derivative for the correlation values using a three-dimensional Lagrangian interpolation algorithm, and generate an indication when the second derivative exceeds a predetermined threshold.

In still another further aspect, a computer readable medium encoded with a program is provided. The medium is configured to instruct a computer to acquire a plurality of multi-axial field-of-view (AFOV) datasets, the datasets including a plurality of pairs of adjacent images, determine a correlation value for each pair of adjacent images, calculate a derivative for the correlation values, and generate an indication when the derivative exceeds a predetermined threshold.

DETAILED DESCRIPTION OF THE INVENTION

In some known CT imaging system configurations, an X-ray source projects a fan-shaped beam which is collimated to lie within an X-Y plane of a Cartesian coordinate system and generally referred to as an "imaging plane". The X-ray beam passes through an object being imaged, such as a patient. The beam, after being attenuated by the object, impinges upon an array of radiation detectors. The intensity of the attenuated radiation beam received at the detector array is dependent upon the attenuation of an X-ray beam by the object. Each detector element of the array produces a separate electrical signal that is a measurement of the beam intensity at the detector location. The intensity measurements from all the detectors are acquired separately to produce a transmission profile.

In third generation CT systems, the X-ray source and the detector array are rotated with a gantry within the imaging plane and around the object to be imaged such that the angle at which the X-ray beam intersects the object constantly changes. A group of X-ray attenuation measurements, i.e., projection data, from the detector array at one gantry angle is referred to as a "view". A "scan" of the object comprises a set of views made at different gantry angles, or view angles, during one revolution of the X-ray source and detector.

In an axial scan, the projection data is processed to construct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display. Current PET scanners incorporate a process similar to that found in CT, in that a map or the object attenuation can be generated. A common method to perform this attenuation measurement includes use of rotation rod sources containing positron-emitting radionuclides. The rods rotate outside the patient bore, but inside the diameter of the PET detector ring. Annihilation events occurring in the rods can send one photon into a near-side detector while the pair photon traverses the object of interest in a manner similar to the CT X-ray. The data found from this method contains essentially the same information as that found from the CT method except for the statistical quality of the resultant data. In the rotating rod case, the statistical quality is orders of magnitude inferior to most common CT scans. For the PET purpose, data acquired in this manner is used to correct for the attenuation seen in the object by the 511 keV photons, which is often the most substantial correction performed on the PET data.

To reduce the total scan time, a "helical" scan may be performed. To perform a "helical" scan, the patient is moved while the data for the prescribed number of slices is acquired. Such a system generates a single helix from a fan beam helical scan. The helix mapped out by the fan beam yields projection data from which images in each prescribed slice may be reconstructed.

Reconstruction algorithms for helical scanning typically use helical weighing algorithms that weight the collected data as a function of view angle and detector channel index. Specifically, prior to a filtered backprojection process, the data is weighted according to a helical weighing factor, which is a function of both the gantry angle and detector angle. The weighted data is then processed to generate CT numbers and to construct an image that corresponds to a two dimensional slice taken through the object.

At least some CT systems are configured to also perform Positron Emission Tomography (PET) and are referred to as PET-CT systems. Positrons are positively charged electrons (anti-electrons) which are emitted by radio nuclides that have been prepared using a cyclotron or other device. The radionuclides most often employed in diagnostic imaging are fluorine-18 ($^{18}F$), carbon-11 ($^{11}C$), nitrogen-13 ($^{13}N$), and oxygen-15 ($^{15}O$). Radionuclides are employed as radioactive tracers called "radiopharmaceuticals" by incorporating them into substances such as glucose or carbon dioxide. One common use for radiopharmaceuticals is in the medical imaging field.

To use a radiopharmaceutical in imaging, the radiopharmaceutical is injected into a patient and accumulates in an organ, vessel or the like, which is to be imaged. It is known that specific radiopharmaceuticals become concentrated within certain organs or, in the case of a vessel, that specific radiopharmaceuticals will not be absorbed by a vessel wall. The process of concentrating often involves processes such as glucose metabolism, fatty acid metabolism and protein synthesis. Hereinafter, in the interest of simplifying this explanation, an organ to be imaged including a vessel will be referred to generally as an "organ of interest" and the invention will be described with respect to a hypothetical organ of interest.

After the radiopharmaceutical becomes concentrated within an organ of interest and while the radionuclides decay, the radionuclides emit positrons. The positrons travel a very short distance before they encounter an electron and, when the positron encounters an electron, the positron is annihilated and converted into two photons, or gamma rays. This annihilation event is characterized by two features which are pertinent to medical imaging and particularly to medical imaging using photon emission tomography (PET). First, each gamma ray has an energy of approximately 511 keV upon annihilation. Second, the two gamma rays are directed in nearly opposite directions.

In PET imaging, if the general locations of annihilations can be identified in three dimensions, a three dimensional image of radiopharmaceutical concentration in an organ of interest can be reconstructed for observation. To detect annihilation locations, a PET camera is employed. An exemplary PET camera includes a plurality of detectors and a processor which, among other things, includes coincidence detection circuitry.

The coincidence circuitry identifies essentially simultaneous pulse pairs which correspond to detectors which are essentially on opposite sides of the imaging area. Thus, a simultaneous pulse pair indicates that an annihilation has occurred on a straight line between an associated pair of detectors. Over an acquisition period of a few minutes millions of annihilations are recorded, each annihilation associated with a unique detector pair. After an acquisition period, recorded annihilation data can be used via any of several different well known image reconstruction methods to reconstruct the three dimensional image of the organ of interest.

As used herein, an element or step recited in the singular and preceded with the word "a" or "an" should be understood as not excluding plural the elements or steps, unless such exclusion is explicitly recited. Furthermore, references to "one embodiment" of the present invention are not intended to be interpreted as excluding the existence of additional embodiments that also incorporate the recited features.

Also as used herein, the phrase "reconstructing an image" is not intended to exclude embodiments of the present invention in which data representing an image is generated but a viewable image is not. Therefore, as used herein the term "image" broadly refers to both viewable images and data representing a viewable image. However, many embodiments generate (or are configured to generate) at least one viewable image.

Figure 1:
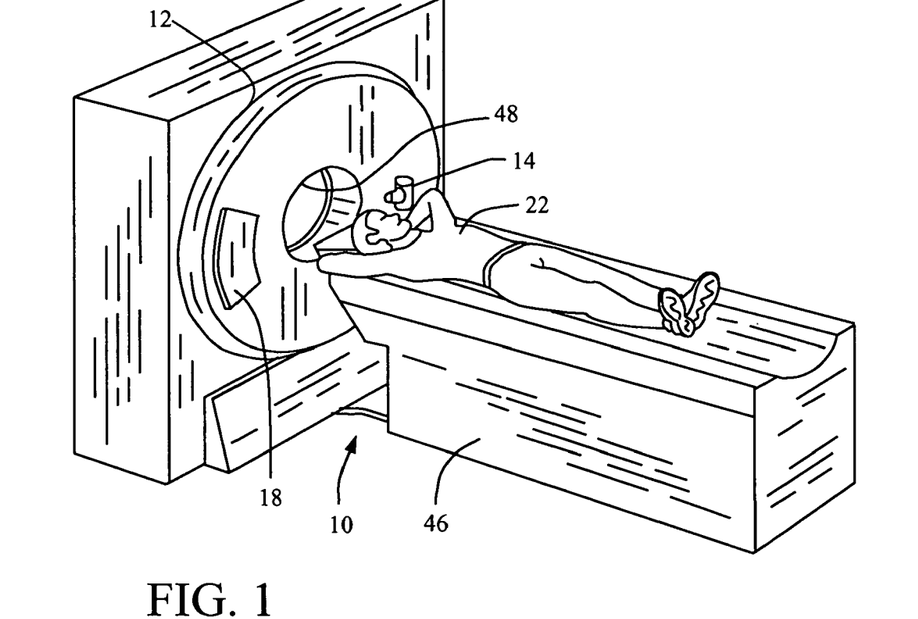
FIG. 1 is a pictorial view of an imaging system.
Figure 2:
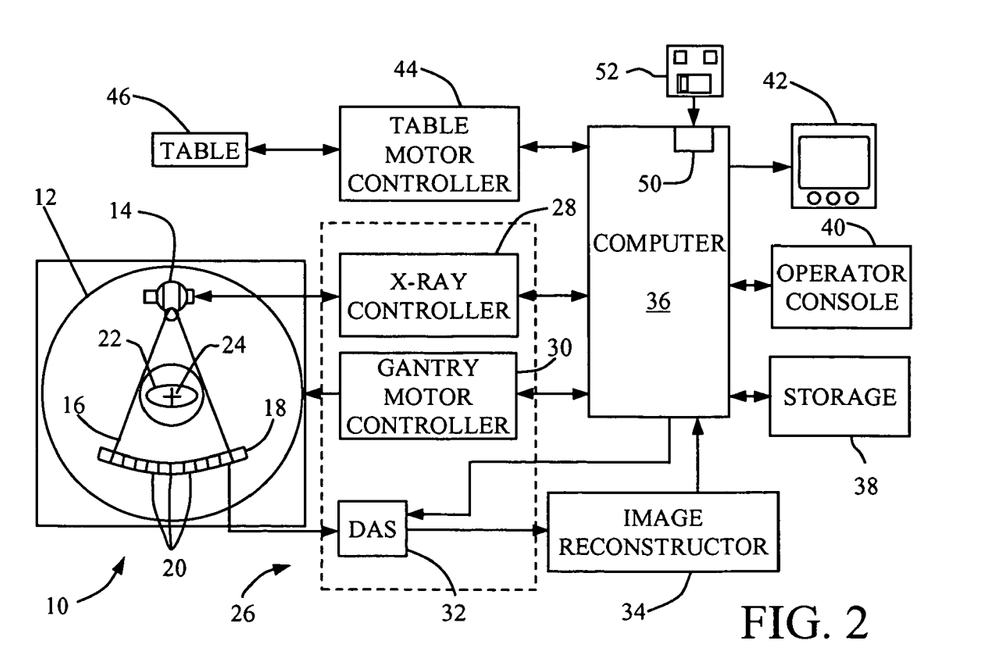
FIG. 2 is a block schematic diagram of the system illustrated in FIG. 1.

Referring to FIGS. 1 and 2, a multi-slice scanning imaging system, for example, a Positron Emission Tomography/Computed Tomography (PET-CT) imaging system 10, is shown as including a gantry 12 representative of a "third generation" CT imaging system in combination with PET circuitry. Gantry 12 has an X-ray source 14 that projects a beam of X-rays 16 toward a detector array 18 on the opposite side of gantry 12. Detector array 18 is formed by a plurality of detector rows (not shown) including a plurality of detector elements 20 which together sense the projected X-rays that pass through an object, such as a medical patient 22. Each detector element 20 produces an electrical signal that represents the intensity of an impinging X-ray beam and hence allows estimation of the attenuation of the beam as it passes through object or patient 22. During a scan to acquire X-ray projection data, gantry 12 and the components mounted thereon rotate about a center of rotation 24. FIG. 2 shows only a single row of detector elements 20 (i.e., a detector row). However, a multislice detector array 18 includes a plurality of parallel detector rows of detector elements 20 such that projection data corresponding to a plurality of quasi-parallel or parallel slices can be acquired simultaneously during a scan.

Rotation of gantry 12 and the operation of X-ray source 14 are governed by a control mechanism 26 of PET-CT system 10. Control mechanism 26 includes an X-ray controller 28 that provides power and timing signals to X-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized X-ray data from DAS 32 and performs high-speed image reconstruction. The reconstructed image is applied as an input to a computer 36 which stores the image in a storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, X-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

In one embodiment, computer 36 includes a device 50, for example, a floppy disk drive or CD-ROM drive, for reading instructions and/or data from a computer-readable medium 52, such as a floppy disk or CD-ROM. In another embodiment, computer 36 executes instructions stored in firmware (not shown). Computer 36 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein. PET-CT system 10 also includes a plurality of PET detectors. The PET detectors and detector array 18 both detect radiation and are both referred to herein as radiation detectors. In one embodiment, PET-CT system 10 is a Discovery LS PET-CT system commercially available from General Electric Medical Systems, Waukesha Wis., and configured as herein described, including the ability to acquire the attenuation information from both the CT and the rotating rod source(s) incorporated into the PET gantry, as described previously. In another embodiment, system 10 performs at least one of a CT and PET imaging, but not both. In an alternative embodiment, imaging system 10 is an imaging modality other than CT and PET.

Although the specific embodiment mentioned above refers to a third generation CT system and a PET imaging system, the methods described herein equally apply to fourth generation CT systems (stationary detector—rotating X-ray source), fifth generation CT systems (stationary detector and X-ray source) or other PET-only or nuclear systems wherein a rod-source attenuation measurement system is incorporated.

Additionally, although the herein described methods are described in a medical setting, it is contemplated that the benefits of the invention accrue to non-medical imaging systems such as those systems typically employed in an industrial setting or a transportation setting, such as, for example, but not limited to, a baggage scanning system for an airport or other transportation center. The benefits also accrue to micro PET and CT systems which are sized to study lab animals as opposed to humans.

Figure 3:
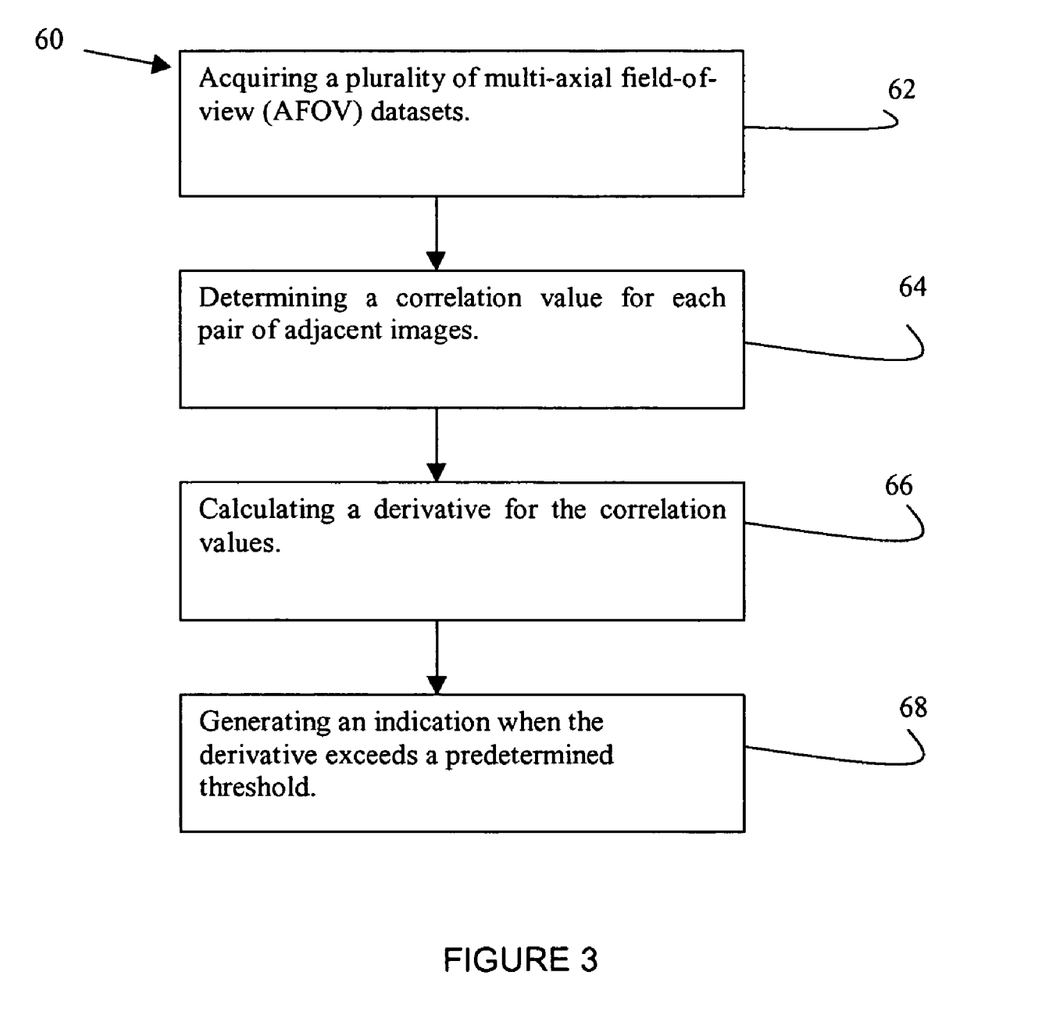
FIG. 3 is a method for retrospectively measuring a plurality of transmission datasets.

FIG. 3 is a method 60 for retrospectively measuring a plurality of transmission datasets collected using PET system 10. In the exemplary embodiment, method 60 includes acquiring 62 a plurality of multi-axial field-of-view (AFOV) datasets, wherein the datasets include a plurality of pairs of axially-adjacent images, determining 64 a correlation value for each pair of adjacent images, calculating 66 a derivative for the set of correlation values, and generating 68 an indication when the derivative exceeds a predetermined threshold.

In the exemplary embodiment, a plurality of multi-axial field-of-view (AFOV) datasets (i.e. slices) are acquired using imaging system 10. A plurality of correlation values are generated in accordance with:

$$Correl(a, b) = \frac{1}{(n-1)} \frac{\sum (a_i - \bar{a})(b_i - \bar{b})}{\sigma_a \sigma_b} \qquad \text{Equation 1}$$

where;
n is the number of pixels in a dataset;
$a_i$ is an ith pixel of dataset a;
$b_i$ is an ith pixel of dataset b;
$\bar{a}$ is an average of all pixels in dataset a;
$\bar{b}$ is an average of all pixels in dataset b;
$\sigma_a$ is a standard deviation of the pixels in dataset a; and
$\sigma_b$ is a standard deviation of the pixels in dataset b.

In use, the correlation value is parameterized by defining two 'neighborhoods' of images. For example, a plurality of temporally sequential datasets are produced as is known in the art. Adjacent datasets are then correlated to produce a plurality of correlation values. More specifically, a first dataset and a second subsequent dataset are used to generate the correlation value using Equation 1. A correlation value is then generated using the second dataset and a third subsequent dataset. In the exemplary embodiment, a correlation value is generated for all the acquired datasets in a pairwise manner between adjacent datasets. The correlation values are then plotted to generate a correlation function, as in graph 70 shown in FIG. 4. In one embodiment, the datasets are separated by at least one slice as shown in FIG. 5. In another embodiment, the datasets are overlapping as shown in FIG. 5 where n is used to define a "neighborhood" of images which could be averaged to generate a single slice "a".

Figure 4:
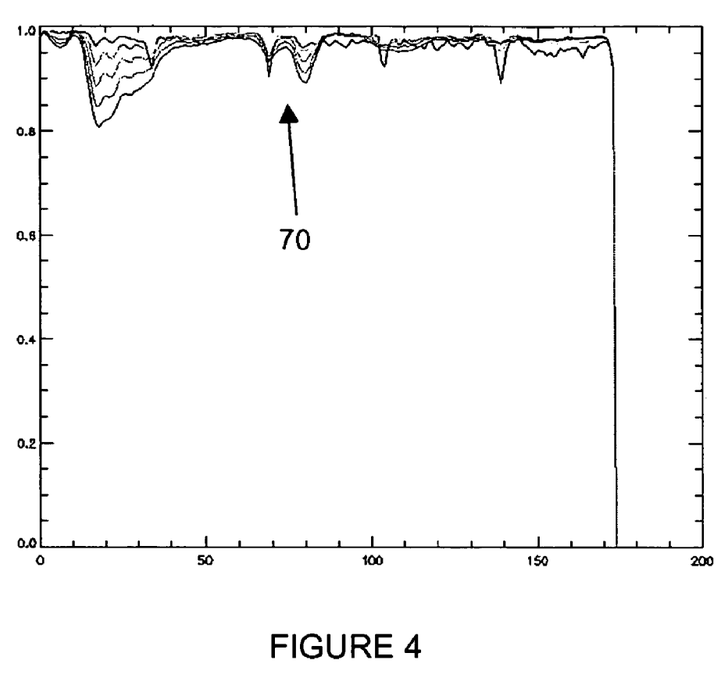
FIG. 4 is a graphical illustration of a plurality of correlation values.
Figure 5:
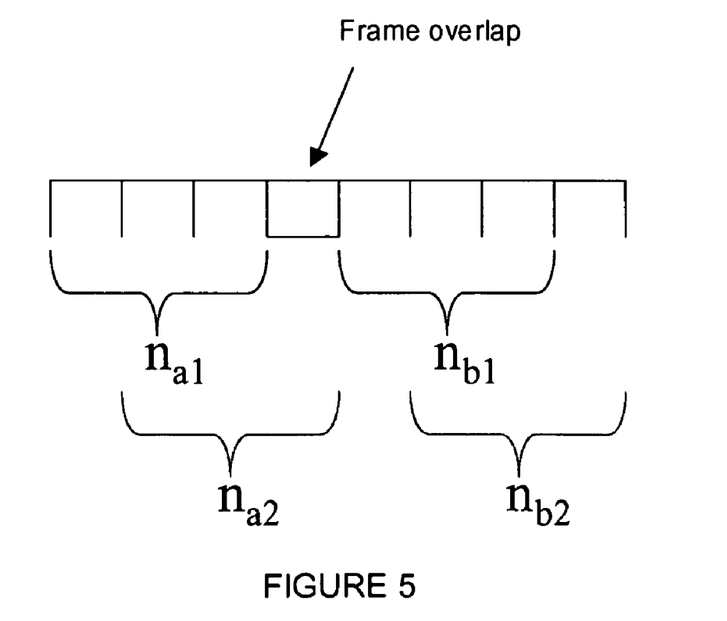
FIG. 5 is an illustration of a pair of images.
Figure 6:
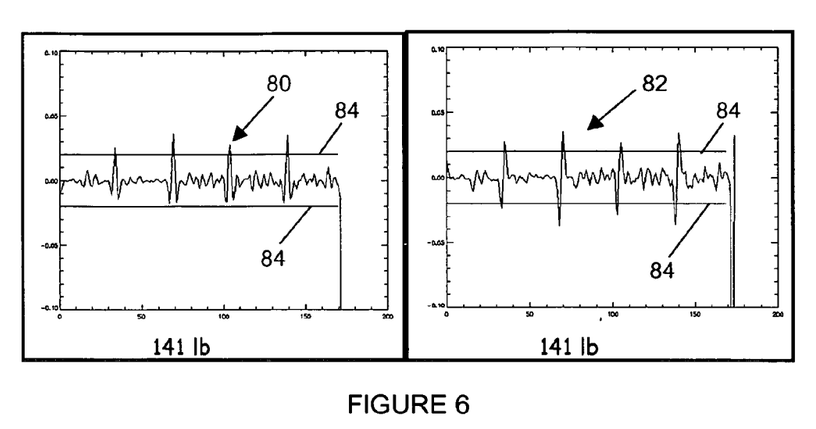
FIG. 6 is a graphical illustration of a first derivative and second derivative of the correlation values shown in FIG. 4.

FIG. 6 illustrates a first derivative 80 and a second derivative 82 of correlation graph 70 shown in FIG. 4. In use, first derivative 80 and second derivative 82 of correlation graph 70 are calculated. In the exemplary embodiment, first derivative 80 is used to determine if correlation graph 70 is continuous or discontinuous, and second derivative 82 is used to determine if correlation graph 70 includes minimums and maximums. In the exemplary embodiment, first derivative 80 and second derivative 82 are calculated using a three-dimensional Lagrangian interpolation algorithm. If correlation graph 70 is discontinuous, a threshold value 84 is defined such that there are likely to be perceivable image quality problems with the attenuation-corrected emission imageset. In another embodiment, first derivative 80 and second derivative 82 are calculated directly using the correlation values.

In one embodiment, if second derivative 82 exceeds predetermined threshold 84, a transaxial smoothing of the transmission data is increased from the default value of using an 8 mm Gaussian filter to using a 12 mm Gaussian filter. Using a 12 mm Gaussian filter facilitates reducing a plurality of horizontal banding artifacts in a coronal view.

Figure 7:
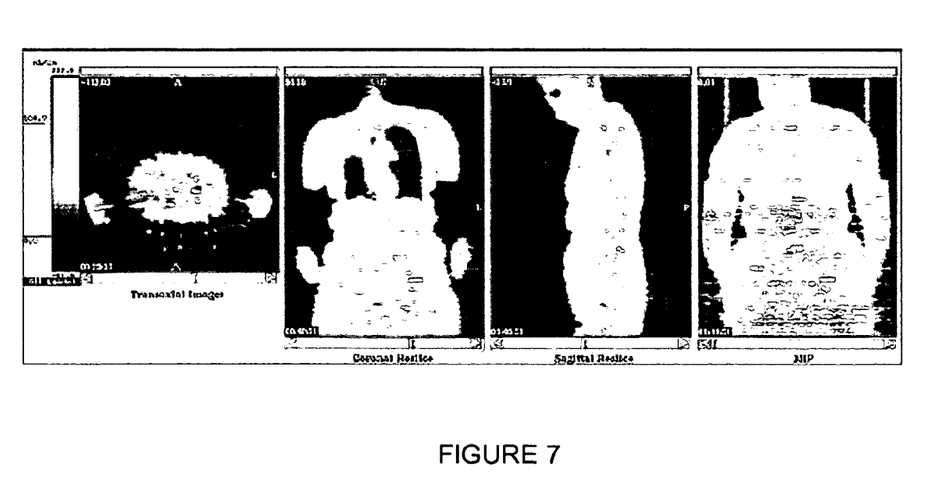
FIG. 7 is an image of a transmission dataset.

FIG. 7 is a first transmission imageset orthogonal reformat of a patient 16. As shown, a plurality of white bands can be seen at the frame boundaries in the maximum intensity projection (MIP) images (right) indicating a potential image quality problem in the attenuation corrected imageset.

Figure 8:
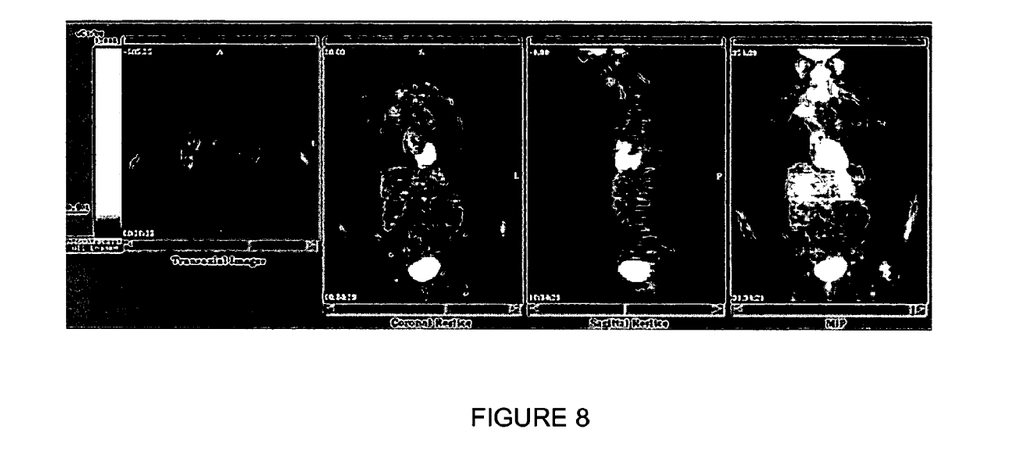
FIG. 8 is a corrected image of the transmission dataset shown in FIG. 7.

FIG. 8 is a fully-corrected transmission imageset orthogonal reformat of a patient 16 shown in FIG. 7. As shown, FIG. 8 includes quality problems at the frame boundaries in the maximum intensity projection (MIP) images (right) indicating a potential image quality problem in the attenuation corrected imageset. These potential image problems can be observed as peaks exceeding threshold 84 in FIG. 6.

Figure 9:
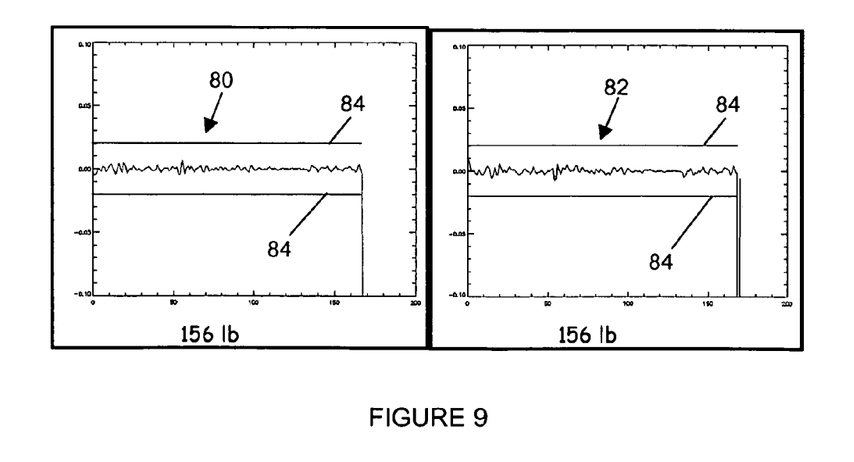
FIG. 9 is a graphical illustration of a first derivative and second derivative of the correlation values used to generate imagesets shown in FIG. 10 and FIG. 11.
Figure 10:
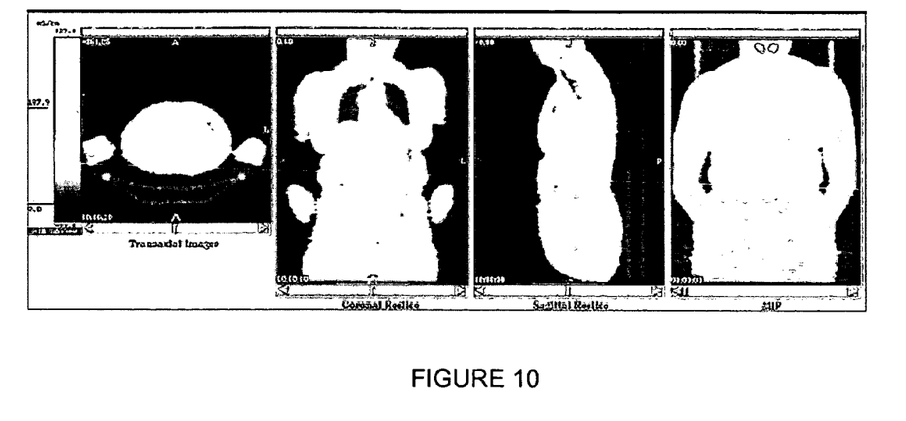
FIG. 10 is an image of a transmission dataset.

FIG. 9 illustrates calculating a first derivative of the correlation coefficient for the images illustrated in FIG. 10, to determine when the correlation function is at least one of continuous and discontinuous, and calculating a second derivative of the correlation coefficient to determine when the correlation function is at a minimum. As shown in FIG. 10, the solid lines represent a threshold value 84 above which image quality problems are likely to appear at the AFOV boundaries, with no overlap applied.

Figure 11:
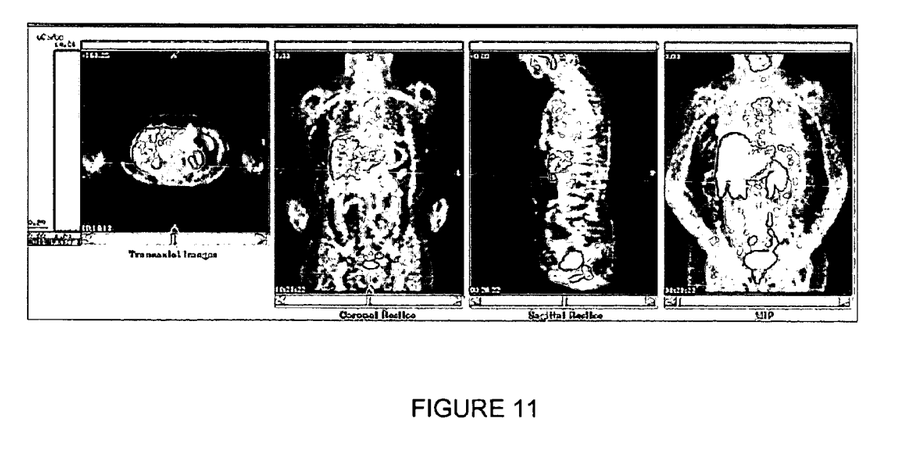
FIG. 11 is an attenuation-corrected emission image using the transmission dataset shown in FIG. 10.

FIG. 11 is the fully-corrected emission dataset which uses the transmission data shown in FIG. 10. As shown, no white bands are apparent at the frame boundaries in the maximum intensity projection (MIP) images (right) indicating a patient transmission imageset with no apparent frame discontinuities. The absence of potential image problems can also be observed as no peaks above the threshold 84 in FIG. 9.

In the exemplary embodiment, the methods described herein can be run immediately after transmission scan acquisitions and reconstructions or on a daily basis. In use, an operator can measure and track over time a quantity of occurrences where the derivative function exceeds a threshold. As the occurrence rate increases, the data can be assessed to determine a proper action to take, such as, but not limited to, lengthening a transmission scan time and replacing at least one radioactive rod source. The methods described herein can also be used after generation of at least one software executable program, in an untended manner with report out of relevant information, such as threshold used, number of frames of transmission data tested, start date for test, end date for test, and number of occurrences above threshold.

The methods described herein facilitate retrospective measurement of the quality of transmission scans acquired on multi-AFOV datasets. In use, by tracking this image quality, and its degradation over time marked by number of occurrences of problems, an operator can collect data which can then be used to predict when and how to address the problems associated with transmission scan quality.

While the invention has been described in terms of various specific embodiments, those skilled in the art will recognize that the invention can be practiced with modification within the spirit and scope of the claims.

What is claimed is:

1. A method for retrospectively measuring a plurality of transmission datasets collected using an imaging system, said method comprising:
    acquiring a plurality of multi-axial field-of-view (AFOV) transmission datasets, said datasets comprising a plurality of pairs of adjacent images;
    determining a correlation value for each pair of adjacent images wherein the correlation value is a statistical representation of the quality of the transmission datasets;
    calculating a derivative for the correlation values; and
    generating an indication when the derivative exceeds a predetermined threshold.

2. A method in accordance with claim 1 wherein said retrospectively measuring a plurality of transmission datasets collected using an imaging system comprises retrospectively measuring a plurality of transmission datasets collected using a Positron Emission Tomography (PET) system.

3. A method in accordance with claim 1 further comprising performing a corrective action in response to the generated indication.

4. A method in accordance with claim 3 wherein said performing a corrective response comprises at least one of a lengthening a transmission scan time, and replacing at least one radioactive rod source.

5. A method in accordance with claim 1 wherein said determining a correlation value for each pair of adjacent images comprises determining a correlation value defined in accordance with:

$$Correl(a, b) = \frac{1}{(n-1)} \sum \frac{(a_i - \bar{a})(b_i - \bar{b})}{\sigma_a \sigma_b};$$

where;
n is the number of pixels in a dataset;

$a_i$ is an ith pixel of dataset a;
$b_i$ is an ith pixel of dataset b;
$\bar{a}$ is an average of all pixels in dataset a;
$\bar{b}$ is an average of all pixels in dataset b;
$\sigma_a$ is a standard deviation of the pixels in dataset a; and
$\sigma_b$ is a standard deviation of the pixels in dataset b.

6. A method in accordance with claim 1 wherein said calculating a derivative for the correlation values further comprises:
calculating a first derivative of the correlation value to determine when the correlation value is at least one of continuous and discontinuous; and
calculating a second derivative of the correlation value to determine when the correlation value is at least one of a minimum and a maximum.

7. A method in accordance with claim 1 wherein said calculating a first derivative and a second derivative comprises calculating a first derivative.

8. A method in accordance with claim 1 wherein said calculating a derivative comprises calculating a second derivative.

9. A method for retrospectively measuring a plurality of transmission datasets collected using Positron Emission Tomography (PET) system, said method comprising:
acquiring a plurality of multi-axial field-of-view (AFOV) datasets, said datasets comprising a plurality of pairs of adjacent images;
determining a correlation value for each pair of adjacent images in accordance with:

$$Correl(a, b) = \frac{1}{(n-1)} \frac{\sum (a_i - \bar{a})(b_i - \bar{b})}{\sigma_a \sigma_b};$$

where;
n is the number of pixels in a dataset;
$a_i$ is an ith pixel of dataset a;
$b_i$ is an ith pixel of dataset b;
$\bar{a}$ is an average of all pixels in dataset a;
$\bar{b}$ is an average of all pixels in dataset b;
$\sigma_a$ is a standard deviation of the pixels in dataset a; and
$\sigma_b$ is a standard deviation of the pixels in dataset b;
calculating a first derivative and a second derivative for the correlation values using a three-dimensional Lagrangian interpolation algorithm; and
generating an indication when the second derivative exceeds a predetermined threshold.

10. An imaging system comprising:
a radiation source;
a radiation detector; and
a computer operationally coupled to said radiation source and said radiation detector, said computer configured to:
acquire a plurality of multi-axial field-of-view (AFOV) datasets, said datasets comprising a plurality of pairs of adjacent images;
determine a correlation value for each pair of adjacent images wherein the correlation value is a statistical representation of the quality of the transmission datasets;
calculate a derivative for the correlation values; and
generate an indication when the derivative exceeds a predetermined threshold.

11. An imaging system in accordance with claim 10, wherein said computer is further configured to perform a corrective action in response to the generated indication.

12. An imaging system in accordance with claim 11, wherein to perform a corrective action in response to the generated indication said computer is further configured to lengthen a transmission scan time.

13. An imaging system in accordance with claim 10, wherein to determine a correlation value for each pair of adjacent images said computer further configured to determine a correlation value defined in accordance with:

$$Correl(a, b) = \frac{1}{(n-1)} \frac{\sum (a_i - \bar{a})(b_i - \bar{b})}{\sigma_a \sigma_b};$$

where;
n is the number of pixels in a dataset;
$a_i$ is an ith pixel of dataset a;
$b_i$ is an ith pixel of dataset b;
$\bar{a}$ is an average of all pixels in dataset a;
$\bar{b}$ is an average of all pixels in dataset b;
$\sigma_a$ is a standard deviation of the pixels in dataset a; and
$\sigma_b$ is a standard deviation of the pixels in dataset b.

14. An imaging system in accordance with claim 10, wherein to calculate a derivative for the correlation values said computer further configured to:
calculate a first derivative of the correlation value to determine when the correlation value is at least one of continuous and discontinuous; and
calculate a second derivative of the correlation value to determine when the correlation value is at least one of a minimum and a maximum.

15. An imaging system in accordance with claim 14, wherein to calculate a first derivative and a second derivative said computer further configured to calculate a first derivative and a second derivative using at least one of the correlation values and a correlation value graph.

16. An imaging system in accordance with claim 14, wherein to calculate a first derivative and a second derivative said computer further configured to calculate a first derivative and a second derivative using a three-dimensional Lagrangian interpolation algorithm.

17. A Positron Emission Tomography (PET) system comprising:
a radiation source;
a radiation detector; and
a computer operationally coupled to said radiation source and said radiation detector, said computer configured to:
acquire a plurality of multi-axial field-of-view (AFOV) datasets, said datasets comprising a plurality of pairs of adjacent images;
determine a correlation value for each pair of adjacent images in accordance with:

$$Correl(a, b) = \frac{1}{(n-1)} \frac{\sum (a_i - \bar{a})(b_i - \bar{b})}{\sigma_a \sigma_b};$$

where;
n is the number of pixels in a dataset;
$a_i$ is an ith pixel of dataset a;
$b_i$ is an ith pixel of dataset b;
$\bar{a}$ is an average of all pixels in dataset a;
$\bar{b}$ is an average of all pixels in dataset b;
$\sigma_a$ is a standard deviation of the pixels in dataset a; and
$\sigma_b$ is a standard deviation of the pixels in dataset b;

calculate a first derivative and a second derivative for the correlation values using a three-dimensional Lagrangian interpolation algorithm; and generate an indication when the second derivative exceeds a predetermined threshold.

18. A computer readable medium encoded with a program configured to instruct a computer to:

acquire a plurality of multi-axial field-of-view (AFOV) datasets, said datasets comprising a plurality of pairs of adjacent images;

determine a correlation value for each pair of adjacent images wherein the correlation value is a statistical representation of the quality of the transmission datasets;

calculate a derivative for the correlation values; and generate an indication when the derivative exceeds a predetermined threshold.

19. A computer readable medium in accordance with claim 18 wherein said program further configured to instruct the computer to perform a corrective action in response to the generated indication.

20. A computer readable medium in accordance with claim 18 wherein said program further configured to instruct the computer to lengthen a transmission scan time.

21. A computer readable medium in accordance with claim 18 wherein said program further configured to instruct the computer to determine a correlation value defined in accordance with:

$$Correl(a, b) = \frac{1}{(n-1)} \frac{\sum (a_i - \bar{a})(b_i - \bar{b})}{\sigma_a \sigma_b};$$

where;

n is the number of pixels in a dataset;

$a_i$ is an ith pixel of dataset a;

$b_i$ is an ith pixel of dataset b;

$\bar{a}$ is an average of all pixels in dataset a;

$\bar{b}$ is an average of all pixels in dataset b;

$\sigma_a$ is a standard deviation of the pixels in dataset a; and $\sigma_b$ is a standard deviation of the pixels in dataset b.

22. A computer readable medium in accordance with claim 18 wherein said program further configured to instruct the computer to:

calculate a first derivative of the correlation value to determine when the correlation value is at least one of continuous and discontinuous; and calculate a second derivative of the correlation value to determine when the correlation value is at least one of a minimum and a maximum.

23. A computer readable medium in accordance with claim 22 wherein said program further configured to instruct the computer to calculate a first derivative and a second derivative using at least one of the correlation values and a correlation value graph.

24. A computer readable medium in accordance with claim 22 wherein said program further configured to instruct the computer to calculate a first derivative and a second derivative using a three-dimensional Lagrangian interpolation algorithm.

25. A computer readable medium encoded with a program configured to instruct a computer to:

acquire a plurality of multi-axial field-of-view (AFOV) datasets, said datasets comprising a plurality of pairs of adjacent images;

determine a correlation value for each pair of adjacent images in accordance with:

$$Correl(a, b) = \frac{1}{(n-1)} \frac{\sum (a_i - \bar{a})(b_i - \bar{b})}{\sigma_a \sigma_b};$$

where;

n is the number of pixels in a dataset;

$a_i$ is an ith pixel of dataset a;

$b_i$ is an ith pixel of dataset b;

$\bar{a}$ is an average of all pixels in dataset a;

$\bar{b}$ is an average of all pixels in dataset b;

$\sigma_a$ is a standard deviation of the pixels in dataset a; and $\sigma_b$ is a standard deviation of the pixels in dataset b;

calculate a first derivative and a second derivative for the correlation values using a three-dimensional Lagrangian interpolation algorithm; and generate an indication when the second derivative exceeds a predetermined threshold.

* * * * *